J. M. ADAMS.
COUPLING.
APPLICATION FILED FEB. 23, 1909.
932,744.
Patented Aug. 31, 1909.
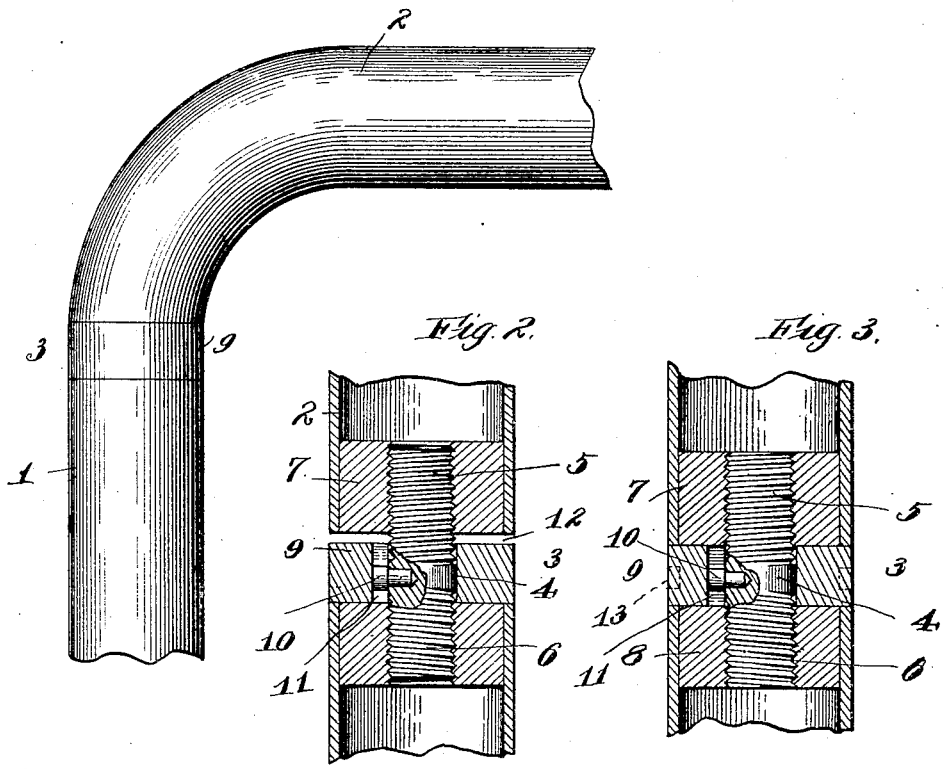

UNITED STATES PATENT OFFICE.

JOHN M. ADAMS, OF CHICAGO, ILLINOIS.

COUPLING.

932,744.  Specification of Letters Patent.  Patented Aug. 31, 1909.

Application filed February 23, 1909. Serial No. 479,335.

*To all whom it may concern:*

Be it known that I, JOHN M. ADAMS, a citizen of the United States, and a resident of Chicago, in the county of Cook and State of Illinois, have invented certain new and useful Improvements in Couplings, of which the following is a specification.

This invention relates to couplings for joining different parts or members of a structure by a screw connection, said screw comprising right and left hand sections, adapted for engagement, respectively, with right and left hand nuts secured in or to the parts to be joined, and a collar on said screw intermediate said screw sections adapted to form a grip for turning said screw and forming an abutment for the opposed surfaces of said connected members.

The object of the present invention is to provide a coupling of this general type so constructed and arranged that the opposed surfaces of both joined parts will be brought into full, firm and equal bearing upon the interposed collar on the screw, by turning said screw in the proper direction, without particular reference to the relative lengths of the screw sections or their engagement with their respective nuts.

To this end my invention consists in forming the collar interposed between the screw sections separate from the screw and splining or otherwise securing said collar to said screw so that said screw and collar will rotate together while, at the same time, said collar will be freely movable endwise of said screw.

The invention also consists of the various other features and details of construction hereinafter described and claimed.

In the accompanying drawing in which a coupling of my invention is fully illustrated—Figure 1 is a side view showing my improved coupling as applied for connecting two tubular members, as the post and arched cross tube of a metal bedstead. Fig. 2 is a vertical, central, sectional view of my improved joint, on an enlarged scale, the joint not being fully closed. Fig. 3 is a view similar to Fig. 2 showing the joint fully closed; and Fig. 4 is an end view of the screw and collar of my improved coupling, detached.

A particular application in which I have found frequent occasion for the use of my improved couplings is for connecting the members of metal beds, as the posts and the arched cross tubes of the head and foot of a metal bedstead, and for purposes of concrete illustration, I have, in the drawing, shown my improved coupling applied for this purpose. My improved couplings admit of general application, however, and by showing a specific application thereof, I desire it to be understood that I do not thereby limit myself thereto.

Referring now to the drawing, 1 designates the post and 2 an arched cross tube of the head or foot of a metal bedstead, said post 1 and cross tube 2 being preferably hollow, and 3 designates, as a whole, one of my improved couplings applied for connecting the ends of the members 1 and 2.

My improved coupling 3, comprises a screw 4 formed on the opposite ends of which are right and left hand screw-threaded sections 5 and 6, respectively adapted for engagement with correspondingly right and left hand screw-threaded nuts 7 and 8 secured in the ends of the posts 1 and cross tube 2 which it is desired to connect. Obviously, where the connected members are solid the screw threaded holes or openings designed to be engaged by the screw 4 may be formed directly in the end of the members which it is desired to connect.

Secured to the screw 4 intermediate the screw threaded sections 5 and 6, so as to rotate therewith, and, at the same time, to be freely movable lengthwise thereof, is a collar 9 which is adapted to form a grip for turning the screw 4 and also to form an abutment against which the ends of the connected members 1 and 2 will bear when said screw is fully set up or tightened. As shown, said collar 9 is of substantially the same diameter as the outsides of the connected members 1 and 2. The size of said collar may be varied, however, as may be desired. Simple means for securing the collar 9 to the screw 4 consist, as shown, of a pin 10 secured in the screw 4 which engages a slot or keyway 11 formed lengthwise in the collar 9. My invention, however, contemplates any other desired or approved means for thus connecting said screw and collar.

For purposes of illustration I have, in Fig. 2 of the drawing, shown the screw 4 as only partially set up or tightened, leaving a space or opening 12 between the end of the collar 9 and the member 2. With the described construction, as said screw 4 is turned to tighten the same, the collar 9 will slide endwise of said screw until the space 12 is fully closed and the members 1 and 2 both come to full bearing on said collar 9, as shown in Fig. 3, when the coupling is completed.

The collar 9 will ordinarily be formed plain, but if desired, my invention contemplates forming one or more spanner holes therein, as indicated in dotted lines at 13.

I claim:—

1. A coupling comprising nuts adapted to be secured to the parts or members to be connected, said nuts being provided, respectively, with screw threads of different lead, a screw having screw-threaded sections of different lead at its opposite ends, adapted, respectively, for engagement with correspondingly threaded nuts, a collar on said screw intermediate the screw-threaded sections at opposite ends of said screw, said collar being thicker than the space between the inner ends of said screw threads, and means for securing said collar to said screw against rotation relatively thereto while leaving said collar freely movable endwise of said screw, substantially as described.

2. A coupling comprising nuts adapted to be secured to the parts or members to be connected, said nuts being provided, respectively, with screw threads of different lead, a screw having screw threaded sections of different lead at its opposite ends, adapted, respectively, for engagement with correspondingly threaded nuts, and a collar splined to said screw intermediate the screw threaded sections at opposite ends of said screw, substantially as described.

3. A coupling comprising nuts adapted to be secured to the parts or members to be connected, said nuts being provided, respectively, with screw threads of different lead, a screw having screw-threaded sections of different lead at its opposite ends, adapted, respectively, for engagement with correspondingly threaded nuts, and a collar splined to said screw threaded sections at opposite ends of said screw, said collar being thicker than the space separating the inner ends of said screw threads, substantially as described.

In testimony, that I claim the foregoing as my invention, I affix my signature in presence of two subscribing witnesses, this 17th day of February, A. D. 1909.

JOHN M. ADAMS.

Witnesses:
K. A. COSTELLO,
E. L. NICHOLSON.